United States Patent [19]

Hutcherson

[11] 4,119,170
[45] Oct. 10, 1978

[54] INTERACTING STEERING-SUSPENSION SYSTEM FOR A WHEELED VEHICLE AND THE LIKE

[76] Inventor: Brian K. Hutcherson, P.O. Box 712, Oswego, Ill. 60543

[21] Appl. No.: 811,169

[22] Filed: Jun. 29, 1977

[51] Int. Cl.² ............................................. B62D 3/02
[52] U.S. Cl. ................................ 180/79; 280/112 A; 280/709
[58] Field of Search .......... 280/112 A, 81 R, DIG. 1, 280/6 H, 6.1, 708, 709, 711, 702, 106.5 R; 180/79, 131

[56] References Cited
U.S. PATENT DOCUMENTS

| 3,430,724 | 3/1969 | Hutcherson | 180/79 |
| 3,820,809 | 6/1974 | Blonar | 280/112 A X |

Primary Examiner—Joseph F. Peters, Jr.
Assistant Examiner—Michael Mar
Attorney, Agent, or Firm—Fitch, Even, Tabin & Luedeka

[57] ABSTRACT

A vehicle having an interacting steering-suspension system wherein a lower frame section having ground engaging wheels or tracks is interconnected to an upper overlying frame section through fluid pressure rams facilitating selective tilting of the upper frame section relative to the lower frame section. The upper frame section supports front and rear steering axle and wheel assemblies through axle support arms which are operative to steer the vehicle when the upper frame section is tilted or when the support arms are pivoted by actuating rams independently of tilting of the upper frame.

12 Claims, 8 Drawing Figures

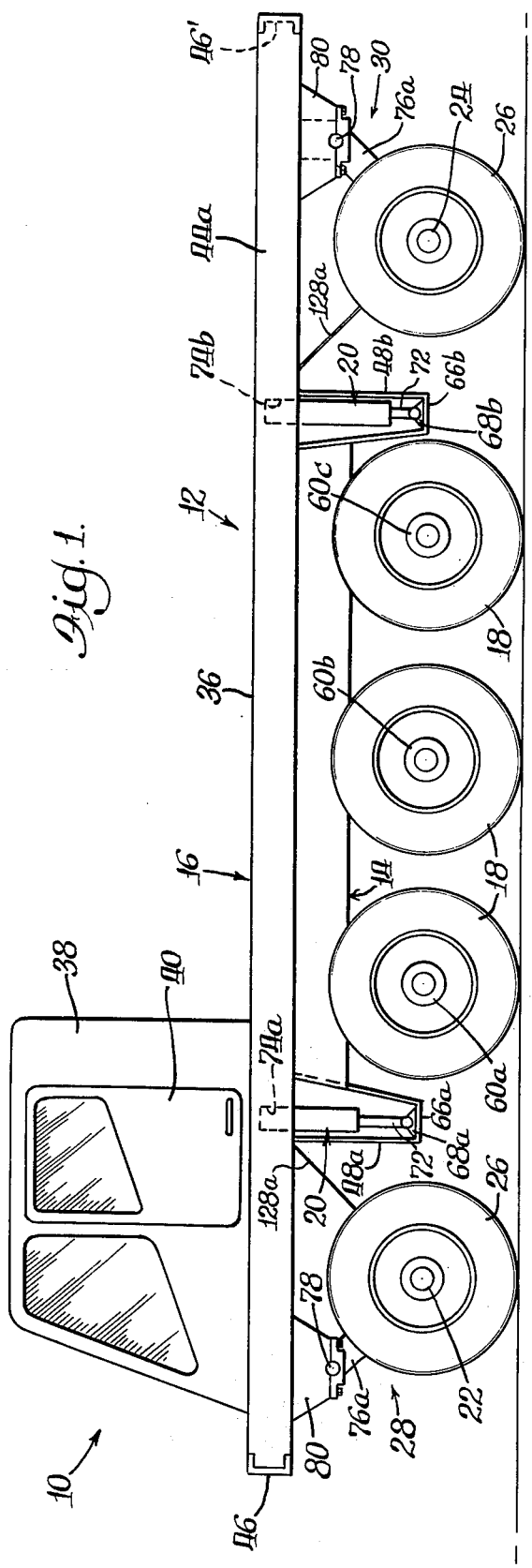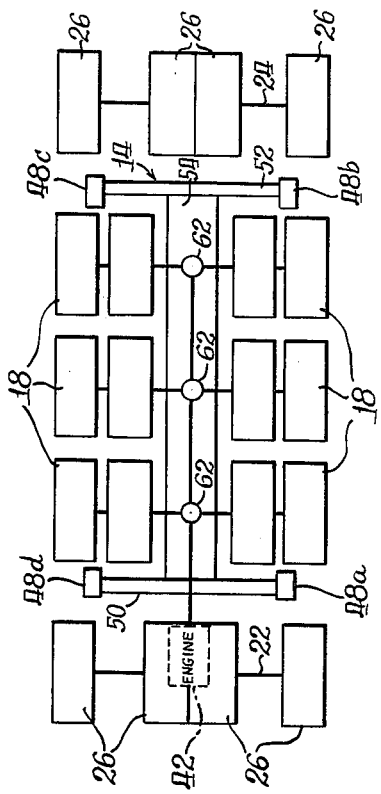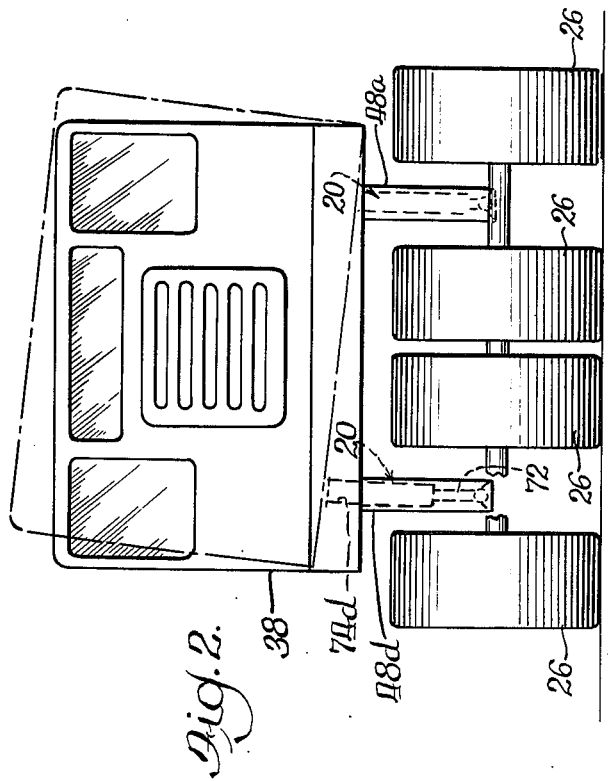

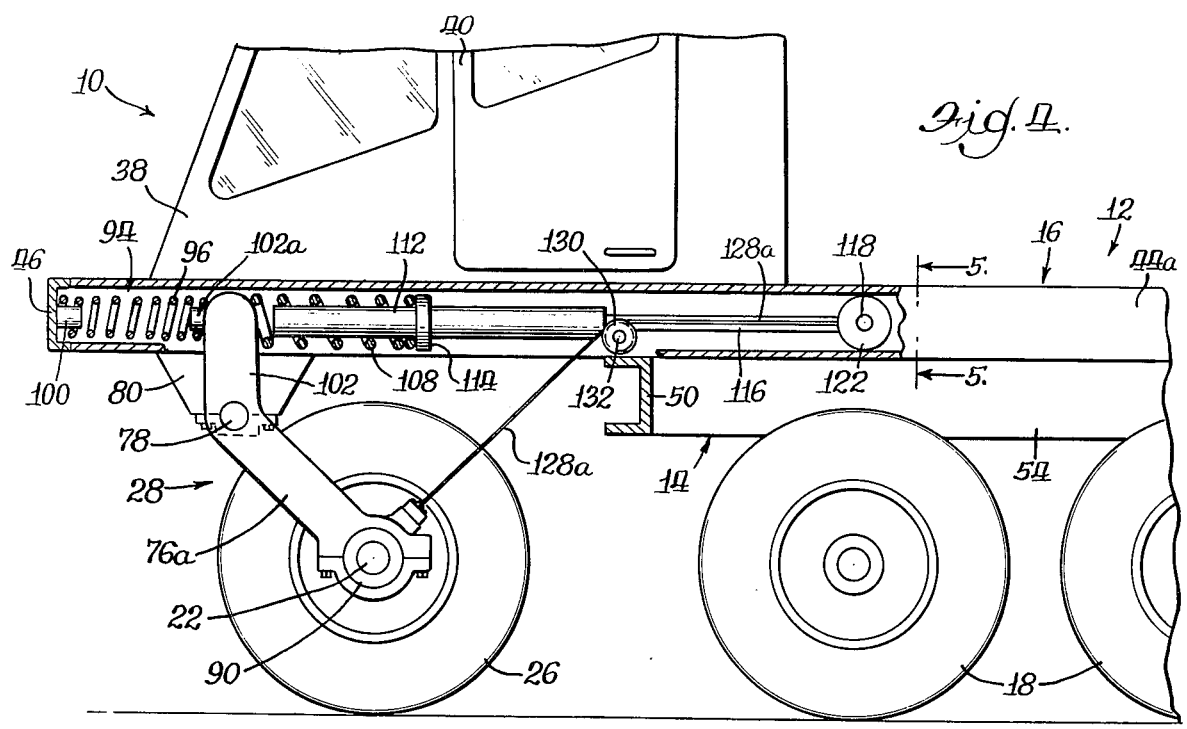
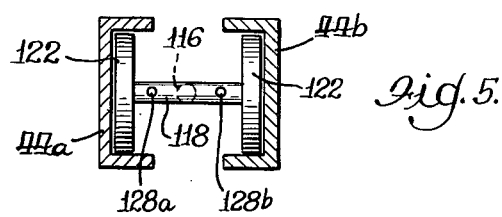
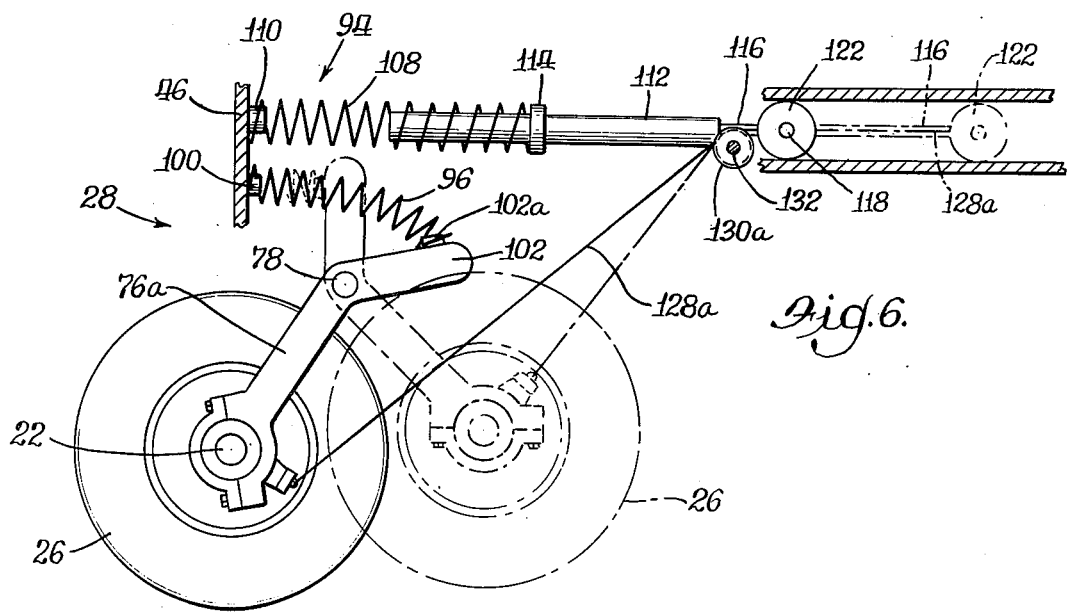

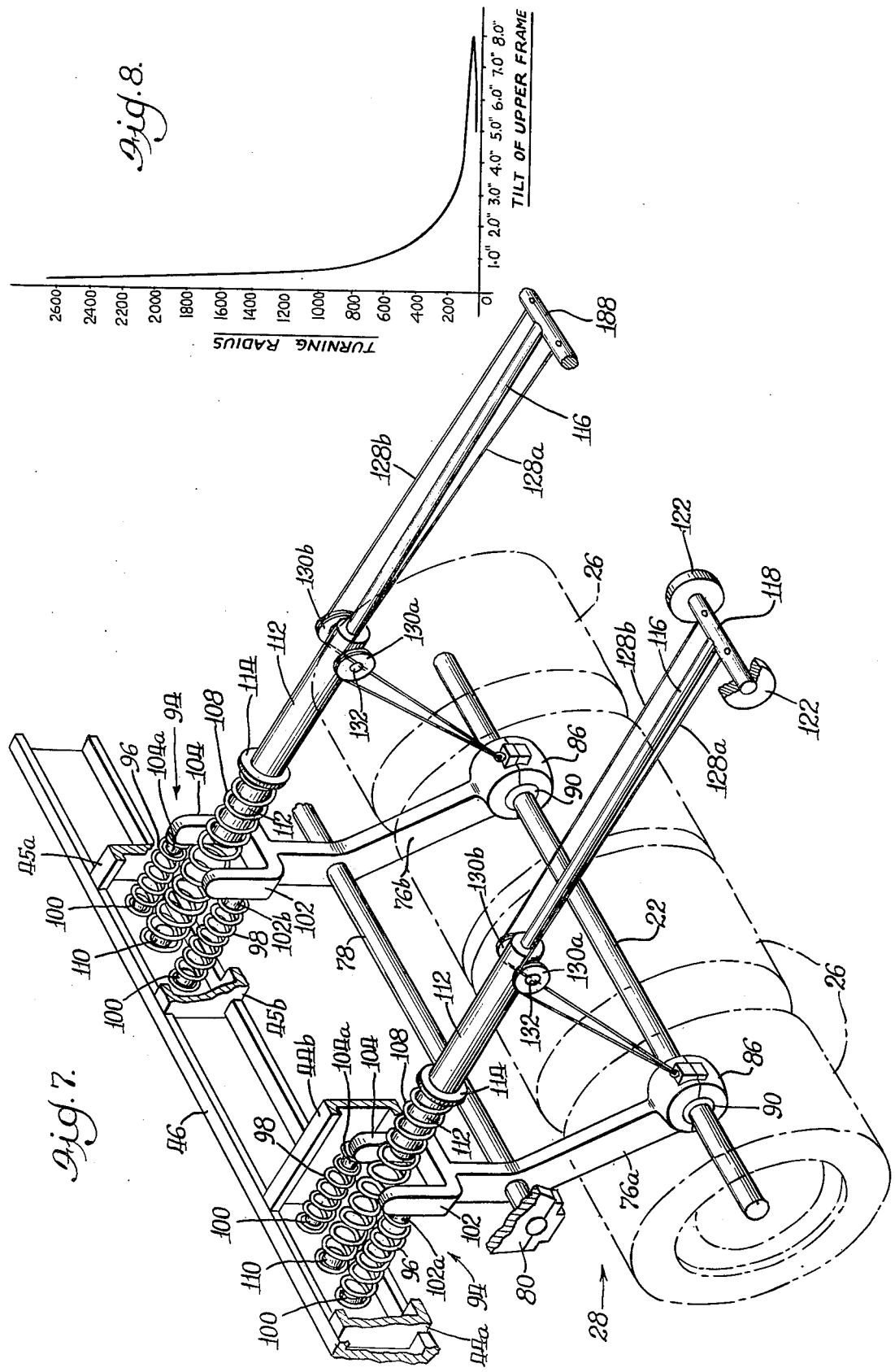

INTERACTING STEERING-SUSPENSION SYSTEM FOR A WHEELED VEHICLE AND THE LIKE

The present invention relates generally to steering systems for vehicles, and more particularly to a novel interacting steering-suspension system which is particularly adapted for heavy duty wheeled or half track type vehicles.

Certain types of vehicles, such as military vehicles of the type termed "off-the-road vehicles", must be capable of sustained operation on what is generally defined as marginal terrain. It is desirable that these vehicles, which may take the form of tracked or wheeled vehicles, also be capable of high speed operations on hard surfaced roads while transporting heavy high density loads. The wheeled vehicles frequently employ relatively large size tires which are inflated to relatively low inflation pressures so as to provide substantial ground contact area with resulting low unit contact pressures.

It can be appreciated that steering a vehicle of the type aforedescribed for transporting heavy loads and employing relatively large size tires having low inflation pressures can be very difficult, particularly when the vehicle is heavily loaded and operating on terrain as often encountered in military operations. The wheel suspension systems for such vehicles must exhibit sufficient resiliency to cushion the heavy loads against potentially damaging shocks and vibration while at the same time facilitating steering of the vehicle through a continuum of large radius turns and/or small corrective changes at high speeds through sharp or small radius turns. It is also desirable that the suspension systems be capable of providing "easy rides"; that is, rides which are neither too harsh nor too soft.

An example of an interacting steering-suspension system for a wheeled vehicle is disclosed in my U.S. Pat. No. 3,430,724, dated Mar. 4, 1969. While the steering-suspension system disclosed in my earlier patent meets the aforenoted criteria for heavy load vehicles, including provision for wide arcuate turns as well as relatively sharp turns of relatively short turning radius, my present invention provides another interacting steering-suspension system for wheeled or track type vehicles which finds particular application in heavy duty vehicles of the type frequently employed in military and other off-the-road operations.

Accordingly, one of the primary objects of the present invention is to provide a novel interacting steering-suspension system for vehicles wherein the suspension components for steering axle and wheel assemblies are also employed to turn the vehicle.

Another object of the present invention is to provide an interacting steering-suspension system for wheeled or half-track type vehicles which employs upper and lower frame sections, the lower frame section having a wheeled or track type ground engaging drive unit mounted thereon and being interconnected to the upper frame section which, in turn, has front and rear suspension and steering axle assemblies mounted thereon operative to effect steering of the vehicle when the upper frame section is selectively tilted relative to the lower frame section.

A feature of the interacting steering-suspension system in accordance with the present invention is the provision of axle support arms having actuating rams associated therewith which facilitate adjustment of the angular relationship of the steering axles relative to the longitudinal axis of the vehicle and enable steering of the vehicle independently of tilting of the upper frame section.

Further objects and advantages of the present invention, together with the organization and manner of operation thereof, will become apparent from the following detailed description of the invention when taken in conjunction with the accompanying drawings wherein like reference numerals designate like elements throughout the several views, and wherein:

FIG. 1 is a side elevational view of a vehicle employing an interacting steering-suspension system in accordance with the present invention;

FIG. 2 is a front elevational view of the vehicle of FIG. 1, the upper frame being shown in phantom in a tilted position during one mode of turning the vehicle;

FIG. 3 is a schematic diagram of the wheel arrangement of the vehicle of FIGS. 1 and 2;

FIG. 4 is a fragmentary side view of the vehicle of FIG. 1, with portions broken away for clarity;

FIG. 5 is an enlarged fragmentary transverse sectional view taken substantially along the line 5—5 of FIG. 4;

FIG. 6 is a fragmentary schematic view showing the front steering axle and wheel assembly in different operating positions, the wheel and associated suspension elements being shown in solid line positions during a short radius turn, and being shown in phantom position during straight movement of the vehicle.

FIG. 7 is a perspective view of a representative one of the front and rear steering-suspension assemblies; and FIG. 8 is a graph showing the relationship of turning radius to tilt angle of the upper vehicle frame.

Referring now to the drawings, and in particular to FIGS. 1 and 2, a vehicle employing an interacting steering-suspension system in accordance with the present invention is indicated generally at 10. The vehicle 10 is particularly adapted for transporting relatively heavy loads over marginal terrain such as frequently encountered in military and other off-the-road operations. The embodiment of the vehicle 10 to be described hereinbelow comprises a self-propelled vehicle, although the present invention may find application in wheeled or track vehicles which are pulled in trailer fashion behind another vehicle.

Briefly, the vehicle 10 includes frame means, indicated generally at 12, defining the longitudinal axis of the vehicle and comprising a first or lower frame section 14 and a second or upper frame section 16. In the illustrated embodiment, the lower frame section 14 has a plurality of ground engaging wheels 18 mounted thereon adapted to be rotatably driven to impart forward and reverse movement to the vehicle. The upper frame section 16 overlies the lower frame section 14 and is interconnected thereto through adjustable means in the form of a plurality of fluid pressure operated actuating cylinders or rams each of which is indicated generally at 20.

As seen in FIG. 1, the upper frame section 16 has greater longitudinal length than the lower frame section 14 so as to extend forwardly and rearwardly from the lower frame section. Front and rear steering axles 22 and 24, respectively, having ground engaging wheels 26 rotatably supported thereon are mounted on the forward and rearward extensions of the upper frame section 16 through identical steering-suspension assemblies indicated at 28 and 30, respectively. As will become more apparent from the following detailed description of the invention, the primary mode of steering vehicle 10 is by selective tilting of the upper frame 16 about its longitudinal axis relative to the lower frame 14 through operation of the actuating rams 20. By raising one side of the upper frame 16 relative to the lower frame 14, the steering axles 22 and 24 undergo a change in their relationship to the longitudinal axis of the vehicle in a manner to steer the vehicle about an axis located outwardly from the side of the vehicle opposite the raised side thereof. Thus, during steering or turning, the center of gravity of the vehicle is shifted in a direction opposing the centrifugal force acting on the vehicle during the turn.

Proceeding now with a more detailed description of the invention, the upper frame section 16 has a generally planar load or cargo carrying bed 36 and an operator cab compartment 38 mounted thereon. The cab 38 has an access door 40 and may house an engine or other suitable power source, indicated in phantom at 42 in FIG. 3, adapted to effect driving rotation of one or more sets of the wheels 18.

In the illustrated embodiment, the upper frame section 16 includes laterally spaced pairs of longitudinal channels 44a, b and 45a, b connected by suitable transverse channels, two of which are indicated at 46 and 46' in FIG. 1. The longitudinal pairs of channels 44a, b, 45a, b are laterally spaced to overlie pairs of identical stirrup supports 48a–d mounted on the outer ends of transverse channels 50 and 52 of the lower frame section 14 as best shown schematically in FIG. 3. The transverse channels 50 and 52 are secured to the opposite ends of a longitudinal frame member 54 upon which are mounted axles 60a–c through conventional spring or pneumatic suspensions (not shown). In the case of a self-propelled vehicle, the axles 60a, b and c have driving relation with the sets of wheels 18 and also with the vehicle engine 42 through suitable drive shafts and differentials, indicated at 62 in FIG. 3, in a known manner. The wheels 18 on the opposite sides of the lower frame section 14 may be driven through separate drive lines or through a common drive line and series connected differentials.

The stirrups supports 48a–d have lower platform plates 66a –d, respectively, upon which are mounted pivot sockets 68a–d each of which has pivotal connection with an extendible piston rod 72 of an associated one of the fluid pressure operated actuating rams 20. The actuating rams 20 may comprise double or single acting hydraulic rams each of which has its upper end received within a suitable corresponding pocket 74a –d mounted on the longitudinal frame channels 44a, b and 45a, b of the upper frame 16 to overlie the stirrup supports. The actuating rams 20 are connected to a source of hydraulic fluid pressure (not shown) through an associated control valve (not shown) operated by a "joy stick" located in the operator cab to facilitate selective extension of the piston rods 72 on the opposite sides of the upper frame 16 to tilt the upper frame about its longitudinal axis during steering the vehicle, as will be described.

Tilting the upper frame section 16 relative to the lower frame section 14 effects steering of the vehicle 10 through the action of the front and rear steering-suspension assemblies 28 and 30 acting on the respective front and rear steering axles 22 and 24. Referring to FIGS. 3–7 for a description of the forward steering-suspension assembly 28 as representative of the front and rear steering-suspension assemblies, a pair of axle support arms 76a and 76b are pivotally mounted on the upper frame section 16 through a transverse pivot shaft 78 the opposite ends of which are mounted in support brackets 80 secured to the frame channels 44a, 45a. The axle support arms 76a, b take the form of bell cranks the lower ends of which have connection to the front steering axle 22 generally adjacent its opposite ends. To facilitate mounting of the turning axle 22, the lower end of each axle support arm 76a, b preferably has a releasable portion 86 so that the axle 22 and associated bearings 90 may be readily mounted on the axle support arms.

Each of the axle support arms 76a, b has resilient means, indicated generally at 94, operatively associated therewith to maintain the steering axle 22 in a position transverse to the longitudinal axis of the vehicle 10 when the ground reaction forces acting on the front wheels 26 are substantially equal. As will become apparent hereinbelow, the rear steering axle 24 is similarly maintained transverse to the longitudinal axis of the vehicle when the ground reaction forces acting on the rear wheels 26 are substantially equal.

The resilient means 94 associated with each of the axle support arms 76a, b includes a pair of main coil compression springs 96 and 98 which have their forward ends received over spring guide stub shafts 100 affixed to the inner surface of the transverse frame member 46, and have their rearward ends received over suitable spring guides 102a and 104a affixed to or formed integral with upwardly extending arm portions 102 and 104 on each of the axle support arms 76a, b.

The bell crank upper arms 102 and 104 preferably subtend an angle of approximately 135° with the axis of the associate lower arm so that the lower arms depend downwardly from the pivot shaft 78 at angles of approximately 45° to the plane of the upper frame 16 when the upwardly extending arm portions 102 and 104 are substantially normal to the plane of the upper frame. In the illustrated embodiment, the lower moment arm of each axle support arm 76a, b, considered from the axis of the associated axle 22 to the pivot shaft axis 78, is approximately twice the length of the upper moment arm, considered from the pivot axis 78 to the axes of the spring guides 102a and 104a. Alternative moment arm ratios may be selected as desired.

The resilient means 94 also include an equalizing coil compression spring 108 coplanar with and spaced between each pair of compression springs 96 and 98. The equalizer springs 108 have their forward ends received over suitable spring guides 110 affixed to the transverse frame member 46, and have their opposite ends coaxially received over associated fluid pressure operated rams 112 each of which has an annular flange 114 thereon for abutment with the adjacent end of its associated equalizer spring. The rams may be single or double acting and are hydraulically operated to extend and retract piston rods 116 which support cross shafts 118 having pairs of guide rollers 122 rotatably mounted thereon. The guide rollers 122 are confined between the horizontal flanges of the pairs of frame channels 44a, b and 45a, b, as best seen in FIG. 5. It is noted that the frame channels of each pair 44a, b and 45a, b are mounted to face each other so as to guide the associated rollers 122 throughout movement of the piston rods 116 and coil compression springs 108. The operating rams 112 are connected to a source of hydraulic pressure (not shown) through a suitable control valve (not shown) adapted for operation by the vehicle operator to selectively extend and retract the piston rods 116 as will be explained hereafter.

A pair of nonextendible cables 128a, b are secured at their ends to each cross shaft 118 and are reeved over associated pairs of pulleys 130a, b rotatably supported on shafts 132 fixedly mounted on the respective frame channels 44a, b and 45a, b of the upper frame section 16. The ends of the cables 128a, b opposite the cross shafts 118 are connected to the lower ends of the associated axle support arms 76a, b through suitable ball joint connections such that the reaches of the cables between the pulleys 130a, b and their connection to the lower ends of the axle support arms subtend approximately 45° angles with the plane of the upper frame 16 when the steering axles 22 and 24 are disposed transverse to the longitudinal axis of the vehicle 10.

As noted, the rear steering-suspension assembly 30 is substantially identical to the forward steering-suspension assembly 28 except that the components are reversed in position so that the lower ends of the axle support arms are inclined toward the front of the vehicle. If desired, conventional shock absorbers (not shown) could be mounted within each of the coil springs 96 and 98 to act against the axle support arms 76a, b and dampen normal riding shock loads.

The main compression springs 96, 98, equalizing springs 108, and size and pressure of the rams 112 are selected such that the moments created by the springs 96 and 98 acting on the upper arms 102, 104 of the respective front and rear axle support arms 76a, b are in equilibrium with the net resultant moments acting on the lower ends of the axle support arms due to the force of the cables 128a, b plus the ground reaction forces on the wheels 26 so that the turning axles 22 and 24 are maintained transverse to the longitudinal axis of the vehicle 10 under normal non-turning operation. The selection of the various springs is dependent upon the weight of the vehicle, the anticipated payload to be carried by the vehicle, and the weight distribution between the front and rear steering wheels 26 and the wheels 18 on the lower frame 14. The weight distribution between the wheels 26 on the upper frame 16 and the wheels 18 on the lower frame 14 may be adjusted as desired while maintaining the upper frame section 16 in close overlying relation to the lower frame section 14.

The springs 96, 98, and 108 are selected to sustain the maximum reaction required to support approximately 10% of the gross weight of the maximum loaded vehicle. The horizontal rams 112 are adjusted by the operator to compensate for the proportionate share of the weight between an empty and fully laden vehicle. Thus for a gross vehicle weight of 100,000 pounds, the forward and rearward axles 22 and 24 would each be subjected to a reaction force of approximately 20,000 pounds acting between the wheels 26 and the ground surface. Further, for an empty vehicle weight of 30,000 pounds, the forward and rearward axles 22 and 24 would be subjected to a reaction force of approximately 6,000 pounds acting between the wheels 26 and the ground surface.

Assuming the steering-suspension assemblies 28 and 30 to be adjusted so that the rams 112 are partially extended and the front and rear steering axles 22 and 24 each support approximately 20% of the gross weight of the vehicle 10, and that the rams 20 are in substantially relaxed or non-extended conditions so that the frame sections 14 and 16 act as a unitary load carrying framework, steering of the vehicle 10 is accomplished as follows. When the operator wishes to turn the vehicle, he extends the operating rams 20 on the side of the vehicle opposite the intended turning axis. As the rams 20 are actuated to extend their respective piston rods, the side of the upper frame section 16 corresponding to the extended piston rods 72 is raised relative to the lower frame section 14 so as to tilt the upper frame section 16 about its longitudinal axis, as best seen in FIG. 2. By so tilting the upper frame section 16 relative to the lower frame section 14, and without adjustment of the operating rams 112, the ground reaction forces acting on the front and rear axle support arms 76a, b corresponding to the raised side of the upper frame section 16 are reduced and the corresponding axle support arms pivot about their pivot axes 78 toward the front and rear, respectively, of the upper frame section. Such movement of the axle support arms 76a, b corresponding to the raised side of the upper frame section 16 causes a change in the angular relationship of the steering axles 22 and 24 relative to the longitudinal axis of the vehicle so as to effect steering of the vehicle about a turning axis disposed outwardly from the nonraised side of the upper frame section 16. It is noted that by mounting both the front and rear axles 22 and 24 through substantially identical steering-suspension assemblies, a significantly shorter turning radius is accomplished for a given tilt angle than if only one of the front and rear axles were to be mounted through a steering-suspension assembly 28 or 30.

FIG. 8 graphically depicts the relationship of the upper frame tilt angle to turning radius for one embodiment of a vehicle having front and rear steering axles suspended in accordance with the aforedescribed steering-suspension assemblies 28 and 30. As seen by the curve of FIG. 8, raising one side of the upper frame section 16 relative to the lower frame section 14 a distance of between approximately 1 inch and 8 inches results in decreasing the turning radius from about 2,000 feet to less than 40 feet. The movement of the axle support arms 76 on the raised side of the upper frame 16 during steering is best illustrated in FIG. 6 where it is seen that reducing the ground reaction force on the wheel 26 by upward tilting the upper frame section 16 relative to the lower frame section 14 results in the wheel 26 moving from a non-steering position, wherein the axle 22 is transverse to the upper frame 116, toward a forward position changing the angular relation of the axle 22 relative to the longitudinal axis of the upper frame 16. It is seen that tilting the upper frame 16 to raise one side thereof a predetermined distance, such as approximately 8 inches, results in the corresponding end of the axle 22 passing through a vertical plane containing the pivot axis 78a, i.e. passing "overcenter", to the position shown in solid lines in FIG. 6. This latter condition is depicted at the point in the descending portion of the curve of FIG. 8 where the abscissa point reverses from an increasing magnitude direction to a decreasing magnitude direction relative to the "zero" coordinate. At this point, the wheel 26 passes overcenter and the turning radius is further reduced as is the tilt of the upper frame is reduced. For "large radius turns" and/or small corrective changes at high speeds, only the vertical rams 20 are actuated. For "small radius turns" i.e. less than 60 feet, both vertical rams 20 and horizontal rams 112 are actuated. Stops (not shown) are preferably mounted on the upper frame channels 44a, b and 45a, b adjacent each axle support arm 76a, b to limit the extent of forward pivotal movement of the front axle support arms and to limit the extent of rearward pivotal movement of the rear axle support arms.

It will be understood that as the angular relation of each of the front and rear steering axles 22 and 24 is changed relative to the longitudinal axis of the vehicle during steering of the vehicle, the steering axles will tend to axially elongate as one end remains relatively fixed and the opposite end is moved forwardly or rearwardly longitudinally of the vehicle. To accommodate such elongation of the steering axles, they are each made in at least two sections having telescoping coupled relation such as through a telescoping spline connection (not shown) in a known manner.

The fully extended positions of all of the forward and rear steering wheels 26 may be accomplished by raising both sides of the upper frame 16 relative to the lower frame 14, at which time the springs 96, 98 and 108 are in substantially zero compression facilitating removal and/or servicing of the springs and associated components of the steering-suspension assemblies 28 and 30.

It will be understood that the vehicle 10 may be turned in either angular direction relative to its longitudinal axis by selectively tilting the upper frame section 16 relative to the lower frame section 14 through the rams 20 as aforedescribed. For large radius turns, only the two lifting rams 20 on the side of the vehicle opposite the intended turning axis are actuated to obtain a relationship of turning radius to tilt distance as depicted by the curve of FIG. 8. When a shorter or "sharp" turn radius is desired, the length of the actuating rams 112 on the raised side of the upper frame 16 is decreased simultaneously with tilting and the compression springs 96 and 98 operate to move the corresponding axle support arms overcenter to positions as shown in solid lines in FIG. 6. Again, in the latter full overcenter position, the springs 96, 98 and 108 are relaxed so that removal and/or servicing of the various components of the steering-suspension assemblies is readily facilitated.

The main compression springs 96, 98 employed in the steering-suspension assemblies 28 and 30 may have substantially lower spring rates than the springs generally used in conventional trucks; i.e., 1,000 lb. per inch for springs 96 and 98 as against 6,000 lb. per inch for conventional truck springs. Under such conditions the vehicle 10 will provide a substantially easier ride. It is believed that the internal and external rolling resistance of the described vehicle 10, as exhibited respectively by the internal friction and external aerodynamic resistance, would be substantially similar to vehicles presently known for similar applications.

By providing separate but interconnected upper and lower frame sections 16 and 14, the lower frame section 14 could be interchanged to provide either tire type or track type drives for the vehicle. The interchangeable components could be provided in kit form so as to greatly facilitate quick and efficient interchange under high stress conditions such as in combat.

While a preferred embodiment of the present invention has been illustrated and described, it will be understood to those skilled in the art that changes and modifications may be made therein without departing from the invention in its broader aspects. Various features of the invention are defined in the following claims.

What is claimed is:

1. In a vehicle, the combination comprising frame means defining the longitudinal axis of said vehicle, said frame means including a first frame section, ground engaging means mounted on said first frame section, said frame means further including a second frame section overlying said first frame section, adjustable means interconnecting said first and second frame sections in a manner to facilitate tilting of said second frame section about its longitudinal axis relative to said first frame section, front and rear axles having ground engaging wheels mounted thereon, suspension means mounting said second frame section on said front and rear axles, said suspension means associated with at least one of said front and rear axles including a pair of axle support arms connected to said one of said axles and pivotally connected to said second frame section, and means cooperative with said axle support arms to maintain said one of said axles in substantially transverse relation to said longitudinal axis when the ground reaction forces acting on the associated wheels are of predetermined magnitude, said last mentioned means being operable to change the angular relation of said one of said axles relative to said longitudinal axis so as to effect steering of said vehicle when the reaction forces acting on said associated wheels are selectively reduced from said predetermined magnitude, said adjustable interconnecting means being operable to tilt said second frame section relative to said first frame section to reduce said reaction forces in a manner to effect steering of said vehicle about an axis located outwardly from the side of said second frame section in the direction of tilt thereof.

2. The combination as defined in claim 1 wherein said second frame section has greater longitudinal length than said first frame section and overlies said first frame section so as to extend forwardly and rearwardly from said first frame section, and wherein said front and rear axles are mounted on said second frame section to underlie said forward and rearward extensions, respectively.

3. The combination as defined in claim 1 wherein said means operatively associated with said axle support arms to selectively maintain said one of said axles in substantially transverse relation to said longitudinal axis includes first resilient means biasing said axle support arms in first pivotal directions about their pivot axes, and second resilient means biasing said axle support arms in pivotal directions opposite said first pivotal directions, said first resilient means being adapted to effect said change in angular relation of said one of said axles relative to said longitudinal axis so as to effect steering of said vehicle when the reaction forces acting on said associated wheels are selectively reduced from said predetermined magnitude.

4. The combination as defined in claim 3 wherein said second resilient means includes a pair of operating rams each of which has an extendible piston rod, means interconnecting the outer end of each of said piston rods to one of said axle support arms, said second resilient means further including additional means biasing said operating rams to positions opposing the action of said first biasing means on said axle support arms, said operating rams being operable to reduce the forces exerted by them on their associated axle support arms independently of said reaction forces acting on said associated wheels so as to change the angular relation of said one of said axles relative to said longitudinal axis independently of tilting of said second frame section relative to said first frame section.

5. The combination as defined in claim 3 wherein said first and second biasing means include compression springs.

6. The combination as defined in claim 4 wherein said additional biasing means comprises coil compression spring means.

7. The combination as defined in claim 6 wherein said first resilient means, said operating rams and said additional biasing means are substantially coplanar.

8. The combination as defined in claim 3 wherein said axle support arms comprise bell crank levers pivotally connected to said second frame section and having first end portions secured to said one of said axles, said bell crank levers having second end portions spaced from their respective pivot axes, said first resilient means acting between said second frame section and said second end portions of said bell crank levers.

9. The combination as defined in claim 1 wherein said suspension means mounting each of said front and rear axles on said second frame section are substantially identical to said suspension means associated with said one of said axles so that tilting said second frame section about its longitudinal axis relative to said first frame section causes both said front and rear axles to change their angular relation to said longitudinal axis in a manner to reduce the turning radius from the turning radius effected when the angular relation of just one of said front and rear axles is changed relative to said longitudinal axis.

10. The combination as defined in claim 1 wherein said adjustable means interconnecting said first and second frame sections comprise fluid pressure operated rams.

11. The combination as defined in claim 1 wherein said first frame section includes a pair of generally vertically disposed stirrup supports on each lateral side thereof, said adjustable means including a fluid pressure operated ram interposed between each of said stirrup supports and said second frame section and selectively operable to tilt said second frame section about its longitudinal axis relative to said first frame section.

12. In a vehicle, the combination comprising frame means defining a longitudinal axis of said vehicle, said frame means including a first frame section, ground engaging means mounted on said first frame section on axles disposed substantially transverse to said longitudinal axis, said frame means including a second frame section overlying said first frame section, adjustable means cooperative with said first and second frame sections and operative to selectively tilt said second frame section substantially about said longitudinal axis relative to said first frame section, front and rear steering axles having associated ground engaging wheels disposed thereon, and steering-suspension means mounting said front and rear steering axles on said second frame section, said steering-suspension means being operative to maintain said steering axles in positions generally transverse to said longitudinal axis when said associated wheels are subjected to predetermined ground reaction forces, and being further operative to change the angular relation of said front and rear steering axles relative to said longitudinal axis so as to effect turning of the vehicle when said second frame section is tilted relative to said first frame section.

* * * * *